US011925229B2

(12) United States Patent
Wroblewski Rodriguez et al.

(10) Patent No.: US 11,925,229 B2
(45) Date of Patent: Mar. 12, 2024

(54) SAFETY HELMET TO BE USED BY A PERSON IN LOW LIGHT CONDITIONS AND MONITORING PROCEDURE ASSOCIATED

(71) Applicant: Comercializadora Mintech Limitada, Santiago (CL)

(72) Inventors: Heinz Eduardo Wroblewski Rodriguez, Santiago (CL); Stefan Mathias Terc Rudloff, Santiago (CL)

(73) Assignee: COMERCIALIZADORA MINTECH LIMITADA, Santiago (CL)

( * ) Notice: Subject to any disclaimer, the term of this patent is extended or adjusted under 35 U.S.C. 154(b) by 835 days.

(21) Appl. No.: 17/043,159

(22) PCT Filed: Mar. 27, 2019

(86) PCT No.: PCT/CL2019/050020
§ 371 (c)(1),
(2) Date: Sep. 29, 2020

(87) PCT Pub. No.: WO2020/191507
PCT Pub. Date: Oct. 1, 2020

(65) Prior Publication Data
US 2021/0153589 A1 May 27, 2021

(51) Int. Cl.
*A42B 3/04* (2006.01)
*A42B 3/16* (2006.01)
(Continued)

(52) U.S. Cl.
CPC ............ *A42B 3/0446* (2013.01); *A42B 3/044* (2013.01); *A42B 3/046* (2013.01); *G08B 3/10* (2013.01);
(Continued)

(58) Field of Classification Search
CPC .......... A42B 3/044; A42B 3/046; G08B 3/10; G08B 21/02; H05B 45/20; H05B 47/10; H05B 47/16; H05B 47/17
See application file for complete search history.

(56) References Cited

U.S. PATENT DOCUMENTS 5,546,609 A * 8/1996 Rush, III .............. G01P 15/135 455/100
9,210,963 B1 * 12/2015 Ellis ....................... H04R 1/028
(Continued)

FOREIGN PATENT DOCUMENTS

CN 102314164 A 1/2012
CN 102742954 A 10/2012

OTHER PUBLICATIONS

Pinto Diaz, David; International Search Report and Written Opinion of the International Searching Authority issued in International Application No. PCT/CL2019/050020; dated Dec. 19, 2019; 16 pages, including English translation of International Search Report.

*Primary Examiner* — Thomas M Sember
(74) *Attorney, Agent, or Firm* — Frost Brown Todd LLP

(57) ABSTRACT

A safety helmet to be used by a person in low light conditions, includes: a cap, to cover the person's head; a wing, which surrounds the entire perimeter of the bottom of the cap; and a visor, which corresponds to a projection of the wing on the front of the cap. The cap also includes a belt, which surrounds the perimeter of the lower part of the cap, over the wing and the visor, which in turn includes at least one front lighting module; at least one rear lighting module; at least two side lighting modules, arranged on each side of the rear lighting module; at least one accelerometer; at least one controller element, which controls the operation of the front, rear and side lighting modules and the accelerometer;
(Continued)

and at least one button to control the operation of the front, rear and side lighting modules.

21 Claims, 12 Drawing Sheets

(51) Int. Cl.

| | |
|---|---|
| ***G08B 3/10*** | (2006.01) |
| ***G08B 21/02*** | (2006.01) |
| ***H05B 45/20*** | (2020.01) |
| ***H05B 47/10*** | (2020.01) |
| ***H05B 47/16*** | (2020.01) |
| ***H05B 47/17*** | (2020.01) |

(52) U.S. Cl.
CPC ............. *G08B 21/02* (2013.01); *H05B 45/20* (2020.01); *H05B 47/10* (2020.01); *H05B 47/16* (2020.01); *H05B 47/17* (2020.01); *A42B 3/163* (2013.01)

(56) References Cited

U.S. PATENT DOCUMENTS

| | | | | |
|---|---|---|---|---|
| 2012/0224356 | A1 | 9/2012 | Fischer et al. | |
| 2015/0196252 | A1* | 7/2015 | Iuliano | A61B 5/746 600/595 |
| 2016/0128412 | A1 | 5/2016 | Baker et al. | |
| 2019/0037954 | A1 | 2/2019 | Friedman et al. | |
| 2019/0045867 | A1* | 2/2019 | Zukowski | H04W 4/90 |
| 2021/0386154 | A1* | 12/2021 | Baker | A42B 3/046 |

* cited by examiner

SAFETY HELMET TO BE USED BY A PERSON IN LOW LIGHT CONDITIONS AND MONITORING PROCEDURE ASSOCIATED

FIELD OF THE INVENTION

The present invention consists of a safety helmet with integrated work lamps to be used on the head of people who perform some type of activity under low light conditions, such as in subway mining, road assistance or airport slabs, rescuers, emergency personnel and in general any worker due to safety reasons needs to be viewed from all angles. It also presents a procedure for the operation of the various embodiments of operation of the safety helmet.

BACKGROUND OF THE INVENTION

In the works of the subway construction industry, pit mining, work in road projects with danger of reaching machinery and vehicles and mainly those carried out on site, even in closed places where there is traffic of machinery or motorized vehicles, all workers are forced to use safety helmets, since given the nature of the activity, the head of the worker and his entire body can be exposed to risks of accidents, such as, falling rocks, fires, explosions, floods, collapse, electrocution, blows, among others.

Currently, there are regulations that define industrial standards to establish the types and classes of protective helmets and to set the performance and testing requirements for these safety elements. For example, the current standard in Chile (NCh461-2001), which is in turn based on the North American standard ANSI z89, requires from all safety helmets being subject to a 5.55 Kgr impact not to present any damage, and must transmit a force equal to or less than 450 Kg. In addition, it must be able to withstand a test voltage of 20 kV, alternating current, 60 cycles for 3 minutes, with a maximum leakage of 9 mA, where the dielectric must not be broken, withstanding up to a voltage of 30 kV, alternating current 60 cycles.

The above represents a great challenge for the construction of safety helmets for the mining industry, since currently any helmet having perforations does not achieve to pass the dielectric test, despite they have been tested before being perforated. This is a challenge, for example, in helmets used in subway mining, where the use of a headlight connected to the front of a safety helmet by means of screws is common.

In such subway mining helmets, the lamp traditionally consists of a headlight that is connected to the helmet through a hook on the front, a flexible cable and a long-life battery, which is hung on the operator's belt, or simply a lamp with an integrated battery.

A disadvantage of this type of helmet is that in the darkness of the tunnels, the headlight only provides a small concentrated beam of light, usually pointing at the ground to see where you are going to walk. For this reason, in total darkness it is almost impossible to clearly visualize a worker who is on his back since his visibility depends on reflective materials located on the clothing or on the helmet itself, which only reflect the light and are not effective when there is no light. This is the case of new tunnels, which do not always have lines of light, or large open workplaces with vehicle traffic, where there are no lights installed.

Many labor accidents are produced by the reach of vehicles, when circulating with defective light bulbs or too much frontal lights, where the reflectance is not enough to give visibility to the worker. This is particularly common when a vehicle faces an operator from behind, where the light bulb points forward; therefore, the driver of the vehicle only sees the reflecting strips of that person's safety vest, but not others that might be on the sides.

This type of accident, besides being able to involve important or irreparable injuries to people, generates detentions, unproductive time and even payment of compensation for accidents to workers or their families, which finally translates into projects with negative results, bankruptcy of construction companies or contractors. In other words, it entails enormous undesirable economic losses.

Lighting equipment already known do not address the problem either of improving the brightness of the workers' field of vision to facilitate their work. In general, the light emitted is a focused beam, with an aperture of no more than 8 degrees, thus projecting a halo only visible when faced. This halo generally has an intensity of 6000 cd (candle power), so the light beam coming from the front of a helmet is only visible at a reduced angle.

Another inconvenience is generated when several operators get together in a place to work or repair something, because they tend to disconnect the lamps from the helmets and illuminate the work area with the lamp in hand, in such a way to increase the light coverage area. This is a great risk for the operators, since for a few seconds their head could be unprotected in their eagerness to improve the lighting conditions.

In the state of the art some inventions are described that have tried to face the problem of improving the lighting coverage in safety helmets and/or allowing the visualization of people in partial or total darkness. An example is the helmet disclosed in the patent CL 539, which allows punctual illumination towards the front and perimeter of the working environment, increasing the safety of the user. This helmet is configured by LED lamps integrated in the front, sides and back, as well as by an external power source configured to control the independent lighting of the helmet's LED lamps.

Although the 360° or omnidirectional lighting provided by the helmet of the aforementioned patent improves the safety of the working environment, there is still the additional need to be able to remotely alert third parties not only of the presence of the person, but also of risk or emergency situations. This is especially important in noisy conditions, such as in mining tunnels, where the noise caused by the machines makes it difficult to alert other workers to emergency situations simply by voice or sound signals. It is in these situations, where the light information and the code language that these allow to create, takes a relevant value in the emergency and risk prevention protocols.

Another need that has been identified in the industry is to provide adequate tools allowing the automatic detection of dangerous or emergency situations in real time, such as an accident of a worker, in order to inform or alert immediately whoever is responsible for such situation. In this sense, by means of the helmet with omnidirectional illumination under the CL 539 patent, the worker can inform his surroundings of his presence with light. However, in the event of an emergency or accident that leaves him unable to request a rescue, said situation may not be perceived by third parties, with which the emergency mechanisms would not be activated in time, putting at risk the integrity or the very life of the worker.

It is therefore an objective of the present invention, to provide a safety helmet allowing to alert third parties not only of the presence of a person in an area with conditions of low luminosity or darkness, but having also the capacity to transmit by means of luminous signals information that gives account of its present state, relative position, type of work and/or emergency situation, among others.

It is another objective of the present invention, to provide a safety helmet that allows to detect and to alert automatically in real time accidents and situations of alert and/or emergency that can affect the user of the helmet or to third parties, transmitting this alert to activate mechanisms of security, alert or rescue.

It is another objective of the present invention to provide a safety helmet with capacity of adaptation and configuration to different work and operation tasks.

It is another objective of the present invention to provide a safety helmet which has a great autonomy and which is completely functional without seeing a significant increase in its weight and without taking away features from the safety, ergonomics and functionality of the helmet itself.

Finally, it is another objective of the present invention, to provide a procedure for the operation of the various embodiments of operation of the safety helmet, depending on the situation in which the user finds.

DESCRIPTION OF THE INVENTION

The present invention consists of a safety helmet with integrated lamps to be used on the head of workers performing some type of activity inside tunnels or in workplaces with low or no lighting.

According to a preferred embodiment of the invention, the safety helmet comprises

- a cap, to cover the person's head;
- a wing, which surrounds the entire perimeter of the lower part of the cap; and
- a visor, corresponding to a projection of the wing on the front of the cap;
- where the cap also comprises a belt surrounding the perimeter of the lower part of the cap, over the wing and the visor, which in turn comprises:
- at least one front lighting module;
- at least one rear lighting module;
- at least two lateral lighting modules, arranged on each side of the rear lighting module;
- at least one accelerometer;
- at least one controller element, which controls the operation of the front, rear and side lighting modules and the accelerometer; and
- at least one button to control the operation of the front, rear and side lighting modules.

The helmet is configured as a monocoque that includes a front visor and a wing surrounding its entire perimeter to protect the anatomy of the worker's head from rock falls, impacts, etc.

Advantageously, the helmet integrates in its own structure the lighting modules, with the purpose of illuminating the environment in an omnidirectional way, providing proper illumination to the work area, to the surroundings and giving the operator full visibility from all angles to increase his safety in dark conditions.

According to an alternative embodiment of the invention, the front and rear lighting modules are integrated to the helmet in a removable way, to allow maintenance and cleaning tasks, but at the same time it provides an airtight insulation to the interior of the module with respect to the environment to protect the focus and the elements of the electric power supply circuit from humidity, dust, etc.

According to another embodiment of the invention, the cap and belt are configured as a single piece of two layers of material. To achieve the above, a monocoque is proposed, consisting of a cap of rigid two-layers material, which form a frontal module of lighting integrated to the structure of the cap and which comprises an opening, which can be transparent, opaque, diffused or of any degree of translucency, and located in the module, through which it illuminates a unidirectional front light arranged inside the module that is capable of generating a light intensity of, for example, 8000 cd to allow the user sufficient visibility of the working area and the area through which he moves.

According to another embodiment of the invention, the front, rear and side lighting modules illuminate through LED, incandescent, fluorescent bulbs, a combination of them or through any type of bulb providing illumination, where the bulbs which are arranged in the front, rear and side lighting modules are of the same color or of different colors.

In a preferred embodiment of the invention, the lights of the front and side lighting modules are white, while the lights of the rear lighting module are red, so as to give an indication to others that the helmet user is turning his back on them.

According to another embodiment of the invention, the front and rear lighting module, in conjunction with the side lighting modules, provide a 360° illumination range.

According to another embodiment of the invention, the front, rear and side lighting modules, the accelerometer, the controller element and the button are airtight, waterproof and modular components, capable of being arranged in or removed from the helmet independently.

As mentioned above, the layers of the helmet form two integrated side lighting modules at the sides of the front and rear modules respectively, consisting of a projection and a central surface, which like the opening described above, can be transparent, opaque, diffused or of any degree of translucence. In its interior there are light panels, such as LED lights, capable of generating a luminous intensity of, for example, 5000 cd and that, at the same time, allow a color change of its lights. Advantageously, this function gives the operator three modes of operation, first, an omnidirectional lighting mode through the use of lights, for example, white, which allow a greater angle of illumination of the environment and at the same time the visibility of the operator at a distance from all angles in the dark. Secondly, a time-limited lighting mode (in seconds) for operation of the front light only so as to enable the worker to make light signals and a third safety mode, where by changing the color of the lights of the rear and side lighting modules, for example, to red, the operator can warn other people in the vicinity of an emergency or request for help.

On the other hand, thanks to the configuration proposed, the helmet can generate 360°-illumination, which represents 98% more visibility and coverage of the work area than the known safety helmets with unidirectional focus. In addition, the fact that the lights are integrated into the helmet cap prevents any current passing inside, thus meeting the safety standards required in the industry.

According to another embodiment of the invention, the helmet also comprises an element for data storage, so that to store data concerning the operation of the helmet or obtained through the controller element and/or the accelerometer, where the data storage element is a airtight, waterproof and modular component, capable of being arranged in or removed from the helmet independently.

According to another embodiment of the invention, the helmet further comprises an element for energy storage, which energizes the front, rear and side modules, the controller element, the accelerometer and the data storage element, where the energy storage element is a airtight, waterproof and modular component, capable of being arranged in of or removed from the helmet independently.

According to another preferred configuration of the invention the element for energy storage, such as one or more batteries, may be attached to the user's belt.

In connection with the control of the switching on and off of lights, together with the manner of selecting the modes of operation, as mentioned above, the invention comprises a controller element, such as a distribution plate, located between the layers forming the helmet, which, through the button, allows to select the mode of illumination, to optimize the energy consumption of the LEDs, to manage the battery charge and also to give low charge warning to warn of the need to charge the systems to continue working. In a preferred embodiment, all the functions described above are carried out by different buttons located on the helmet.

According to another embodiment of the invention, both the controller element and the button, as well as the energy storage element, can also be arranged on the operator's belt to avoid increasing the volume and weight of the helmet.

According to another embodiment of the invention, the belt further comprises an audible alarm, specifically arranged in the rear lighting module, where the audible alarm operates independently or in combination with one or more of the lights of the front, rear or side lighting modules. In addition, the controller element and the button control and operate the functions of the audible alarm respectively.

On the other hand, in a preferred configuration, the energy storage element and the data storage element energize the audible alarm and store information concerning its operation respectively, where the audible alarm is a airtight, watertight and modular component, capable of being arranged in or removed from the helmet independently.

According to another embodiment of the invention, the helmet also comprises a location-tracking element, which makes it possible to establish the exact location of the user of the helmet.

According to another embodiment of the invention, the helmet additionally comprises at least one sensor capable of measuring a physical variable in relation to the helmet or to its environment.

According to another embodiment of the invention, the helmet additionally comprises an input port allowing the connection of additional external devices or sensors to the helmet.

According to another embodiment of the invention, the controller element controls the operation of the tracker element, the sensors and the input port, where the energy storage element and the data storage element energize the tracker element, sensors and input port, and store information concerning their operations respectively.

According to another embodiment of the invention, the tracking element, the sensors and the input port are airtight, waterproof and modular components, capable of being independently arranged or removed from the helmet.

According to another embodiment of the invention, the input port is a port capable of receiving any device or sensor using Plug and Play (PnP) means for its connection or other type of connection means allowing interaction between two devices.

In another preferred embodiment of the invention, the input port is arranged in the rear lighting module.

According to another embodiment of the invention, the data storage element stores data obtained through devices and/or sensors connected to it by means of the input port.

According to another embodiment of the invention, the cap has a harness on its inner side which allows it to be molded and adjusted to the shape of the user's head by means of an adjustment mechanism, wherein said harness also comprising a sweatband and a neck cover. In addition, the cap includes a chinstrap, placed on the sides of the cap, on the lower part of the wing, together with two hooks, placed on the sides of the cap, on the belt, to insert safety earmuffs.

According to another aspect of the present technology, the invention also describes a procedure for controlling a helmet, comprising the following modes of operation by manipulating at least one button on the helmet:

a) from a state of non-operation or turning off of the helmet, by holding down the button for a period of time, turning on the lights at their maximum intensity in the front, rear and side lighting modules of the helmet;
b) from the mode described in a), by holding down the button for a period of time, or in case the energy level in the energy storage element is reduced, keeping the lights on at their maximum intensity in the front and rear lighting modules and decreasing the intensity of the lights in the side lighting modules;
c) from the mode described in b), by holding down the button for a period of time, return to the mode described in a);
d) from the mode described in a) or b), by pressing the button a number of times, switch off the lights on the side lighting modules, keeping the lights on at their maximum intensity on the rear lighting module and keeping the lights on at their maximum intensity on the front lighting module for a period of time, and then switch them off for the same period of time, repeating this cycle for a set time, and then return to the original mode a) or b);
e) from the mode described in a), b) or d), by pressing the button a number of times or in case the accelerometer detects an impact, keeping the lights on at their maximum intensity on the front lighting module in one color, keeping the lights on at their maximum intensity on the rear lighting modules and the side lighting modules in a different color from those of the front lighting module, and turn on the audible alarm periodically;
f) from the mode described in e), by pressing the button a number of times, returning to the mode described in a);
g) from mode a), b) or e), in case the energy level in the energy storage element is reduced and lower than in the mode described in b), keeping the lights on at their maximum intensity in the front and rear modules, turning them off and on again immediately and periodically, in conjunction with the audible alarm, and keeping the lights on the side lighting modules off;
h) from mode a), b), d), e) or g), by keeping the button pressed for a period of time, turning off the lights of the front, rear and side lighting modules and the audible alarm if it is on.

According to another embodiment of the invention, in mode a), the time period is in the range from 0 to 10 seconds, preferably in the range from 2 to 4 seconds.

According to another embodiment of the invention, in mode b), the time period is in the range between 0 to 10 seconds, preferably in the range between 1 and 3 seconds.

According to another embodiment of the invention, in mode b), the level of energy remaining in the energy storage element allows an operation, according to embodiment a), between 30 minutes and 5 hours, preferably in the range between 1 and 3 hours.

According to another embodiment of the invention, in mode b), the intensity of the lights in the side modules decreases by a percentage in the range between 20% and 80%, preferably between 40% and 60%.

According to another embodiment of the invention, in mode c), the period of time is in the range between 0 and 10 seconds, preferably in the range between 1 and 3 seconds.

According to another embodiment of the invention, in mode d), the period of time that the lights in the front lighting module are kept on and off is in the range between 0 to 10 seconds, preferably in the range between 1 and 3 seconds.

According to another embodiment of the invention, the time in which mode d) is performed is in the range between 0 and 60 seconds, preferably in the range between 5 and 15 seconds.

According to another embodiment of the invention, in mode e), the number of times the button is pressed is in the range between 1 and 10 times, preferably in the range between 2 and 4 times.

According to another embodiment of the invention, in mode e), the period of time in which the audible alarm is turned on is in the range between 0 and 30 seconds, preferably in the range between 4 and 10 seconds.

According to another embodiment of the invention, in mode f), the number of times the button is pressed is in the range between 1 and 10 times, preferably in the range between 2 and 4 times.

According to another embodiment of the invention, in mode g), the level of energy remaining in the energy storage element allows an operation, according to embodiment a), between 1 minute and 2 hours, preferably in the range between 10 and 30 minutes.

According to another embodiment of the invention, in mode g), the period of time in which the lights of the front and rear lighting modules are switched off and on again, in conjunction with the audible alarm is in the range between 0 and 30 seconds, preferably in the range between 5 and 15 seconds.

According to another embodiment of the invention, in mode h), the time period is in the range between 0 and 20 seconds, preferably in the range between 3 and 10 seconds

DETAILED DESCRIPTION OF THE INVENTION

Figure 1:
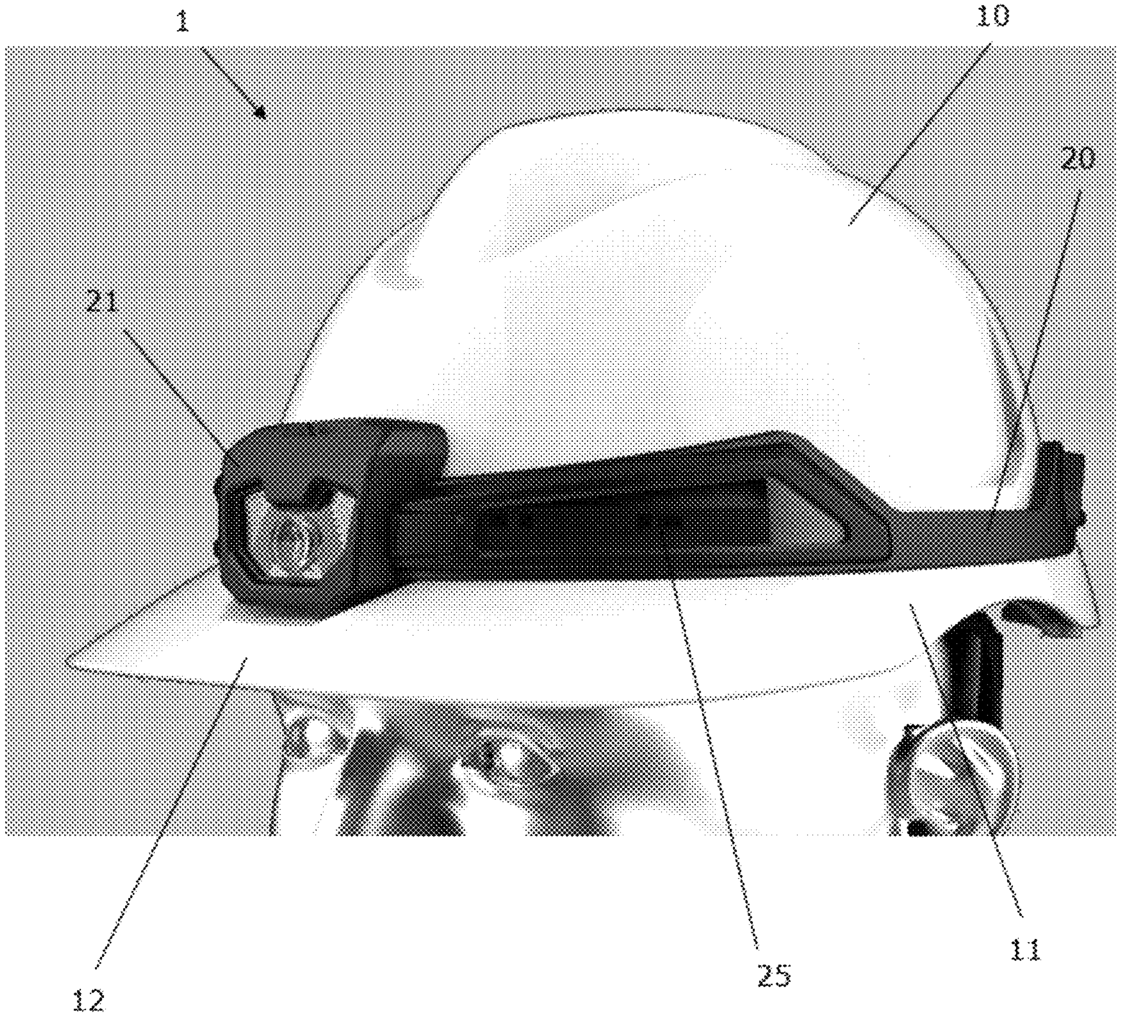
FIG. 1 illustrates a perspective view of the helmet of the present invention.
Figure 2:
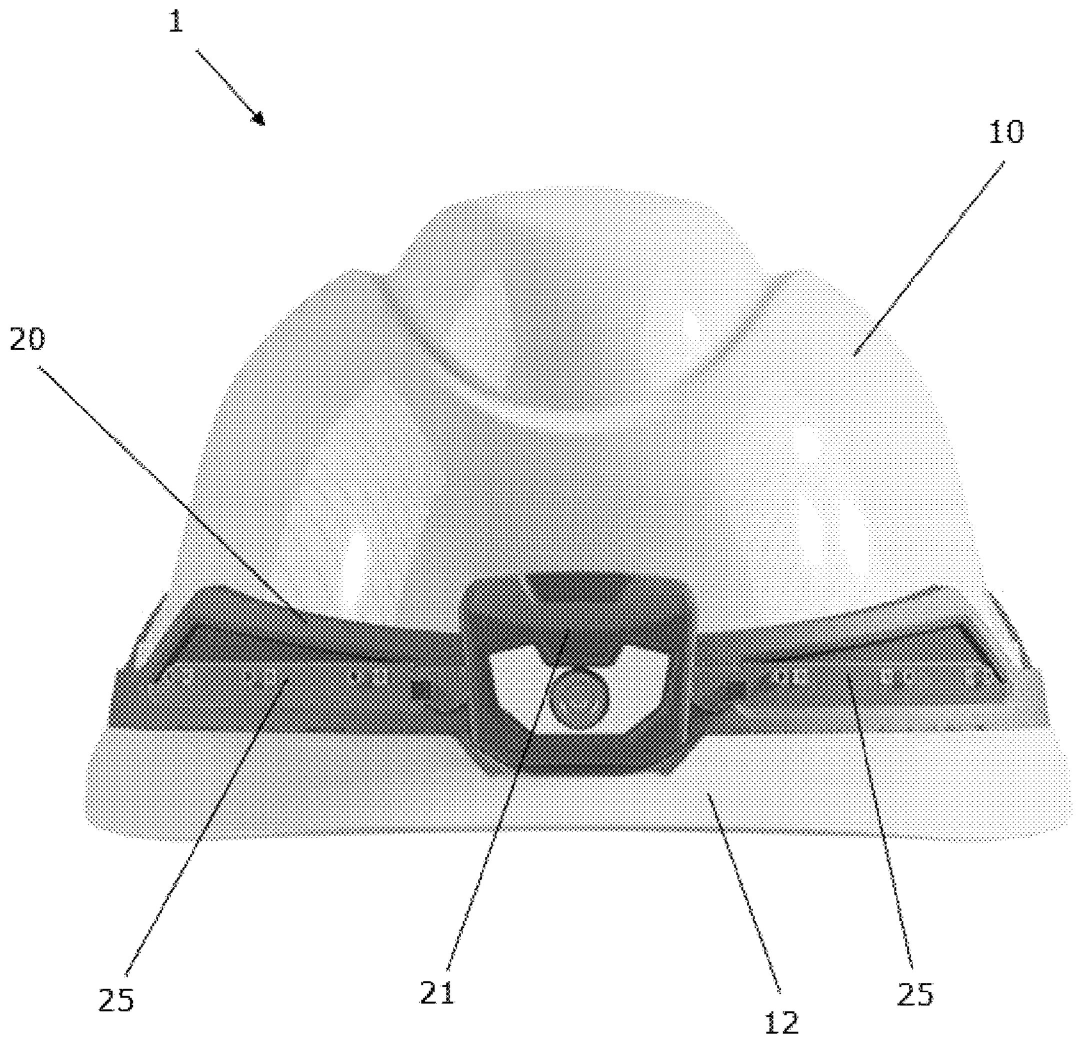
FIG. 2 illustrates a front view of the helmet of the present invention.
Figure 3:
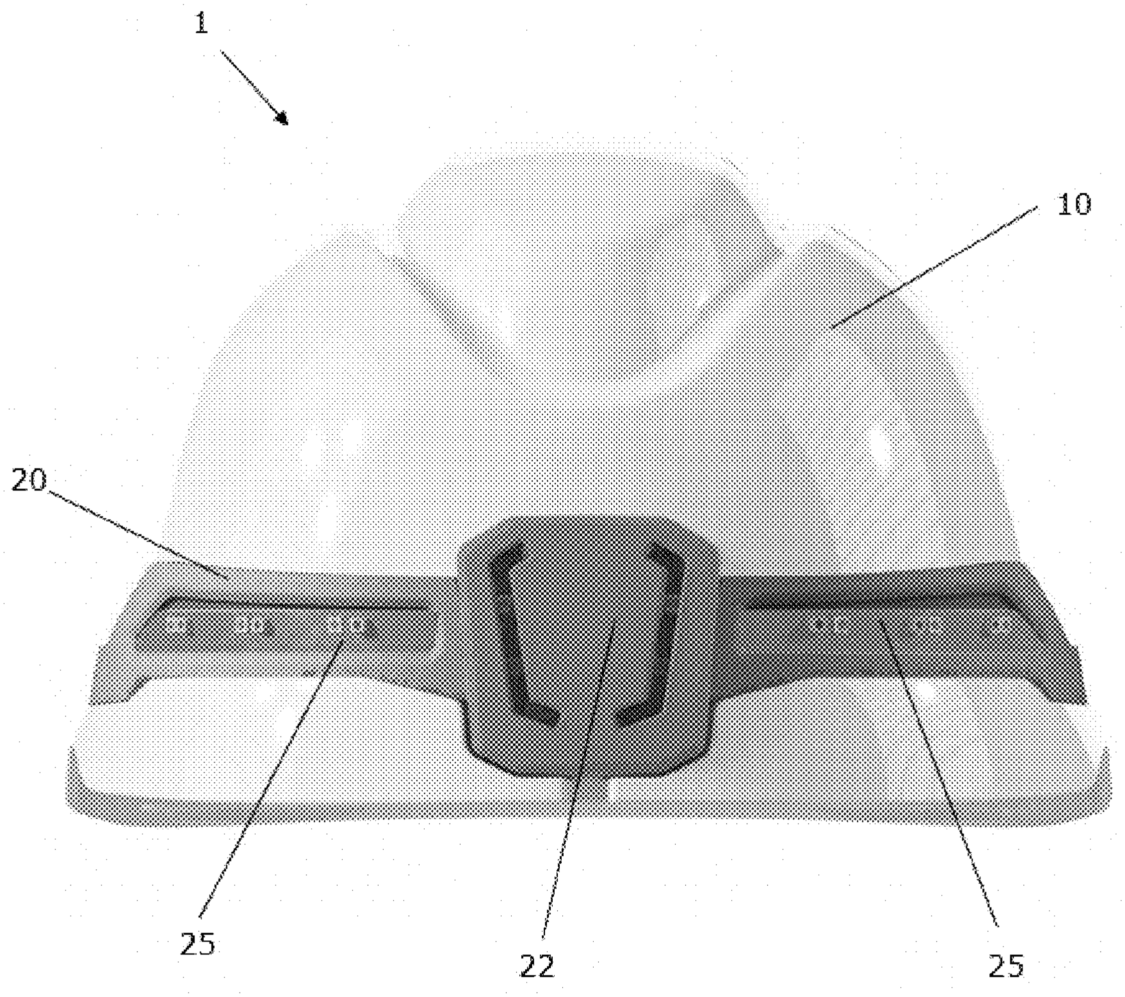
FIG. 3 illustrates a rear view of the helmet of the present invention.

According to FIGS. 1, 2 and 3, the present invention consists of a helmet (1), which consists of a cap (10) of rigid material, such as some type of plastic, with a smooth finish of hemispherical shape and formed by two layers. From the lower part of the cap (10), a section is projected around the entire perimeter of the helmet forming a wing (11), whose width is enlarged in the frontal area of the helmet, to form a visor (12).

In the front area and on the visor (12), the helmet (1) includes a front protrusion or front lighting module (21), formed by the closure of the two layers, which protrudes from the surface of the cap (10) and extending towards the upper vertex of the helmet (1). On the front of the cap (10) and on each side of the front lighting module (21) there are two elongated projections that form lateral lighting modules (25), which extend diagonally towards the rear face of the helmet.

In the same way, in the rear area of the helmet (1), on the wing (11), there is a rear lighting module (22) consisting of a ledge with two openings or stripes, through which the light passes, which can be of different colors, preferably red, in order to alert the helmet wearer's environment that he is on his back. This ledge extends across the whole width of the back of the helmet (1), and comprises, like the front lighting module (21), a side lighting module (25) on each side. The set formed by all the lighting modules (21, 22, 25) form a belt (20) which keeps them communicated. This belt (20) can be an integral part of the helmet (1), as mentioned above, or be a detachable part of the helmet (1).

Figure 4:
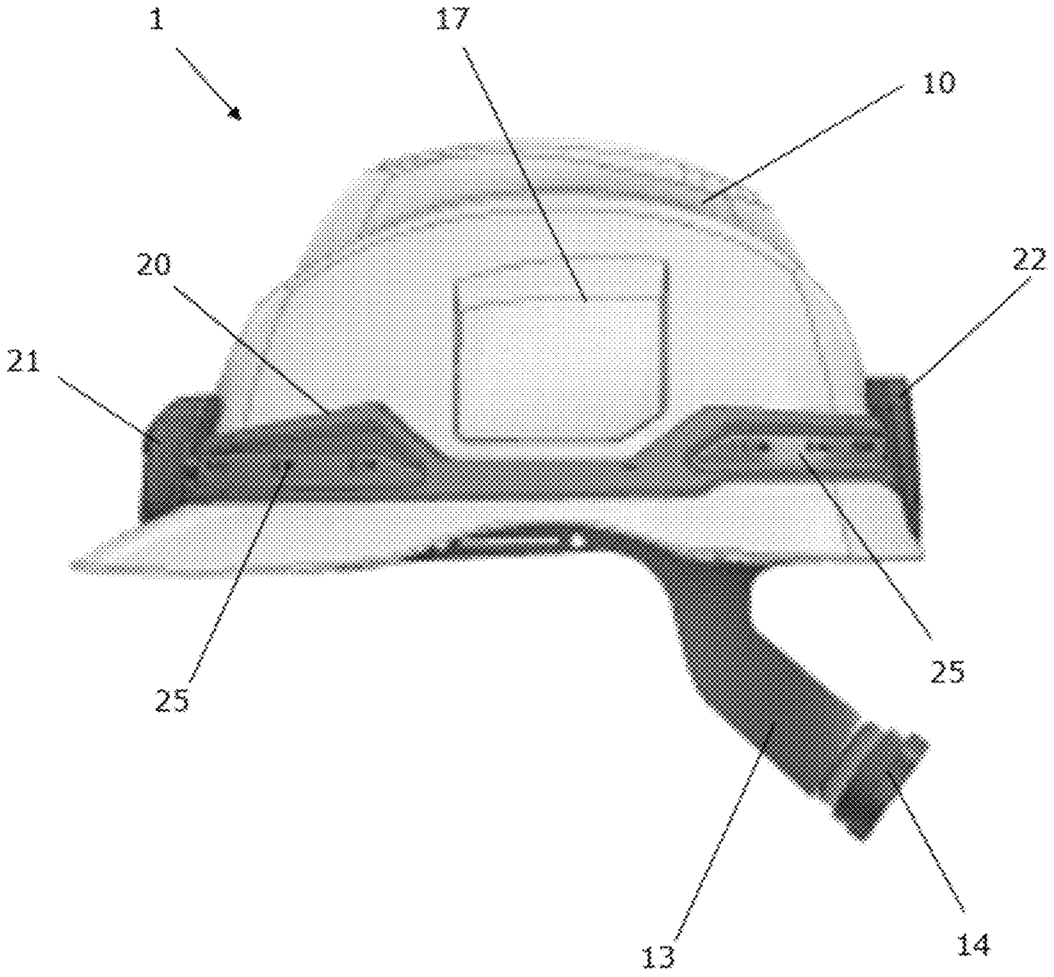
FIG. 4 illustrates a side view of the helmet of the present invention
Figure 5:
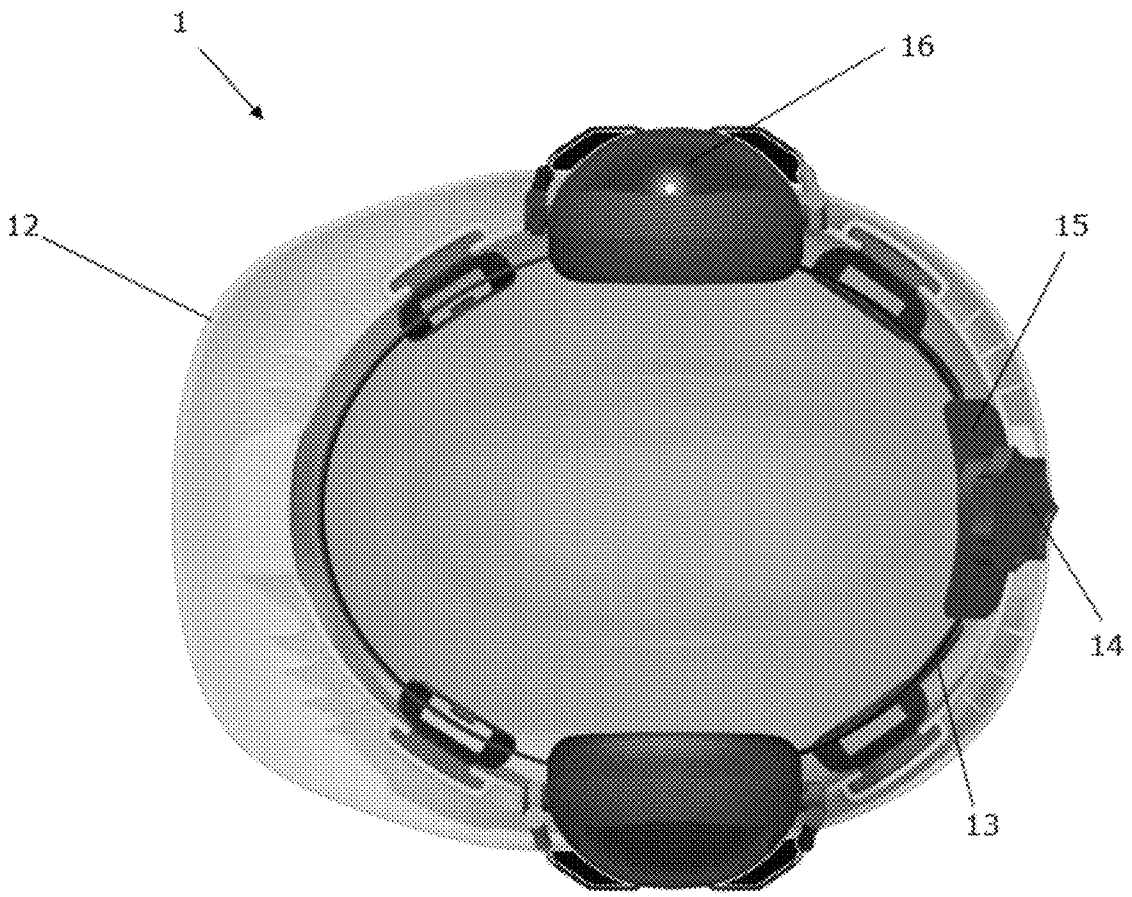
FIG. 5 illustrates a bottom view of the helmet of the present invention.

FIGS. 4 and 5 show other elements of the helmet (1) such as a harness (13) to cushion the wearer's head so that it is not in direct contact with the cap (10). This harness (13) is adjusted by means of an adjustment mechanism (14), such as a screwed or elastic mechanism, or by means of snaps or velcro, or by any other mechanism allowing the harness to be adjusted firmly and comfortably to the user's head, and it having a neck cover (15) on its rear part for greater comfort for the user. The helmet (1) also has hooks (17), arranged on the sides of the cap (10), which serve to place safety earmuffs (16), to protect the user from possible noise in the place of operation.

Figure 6:
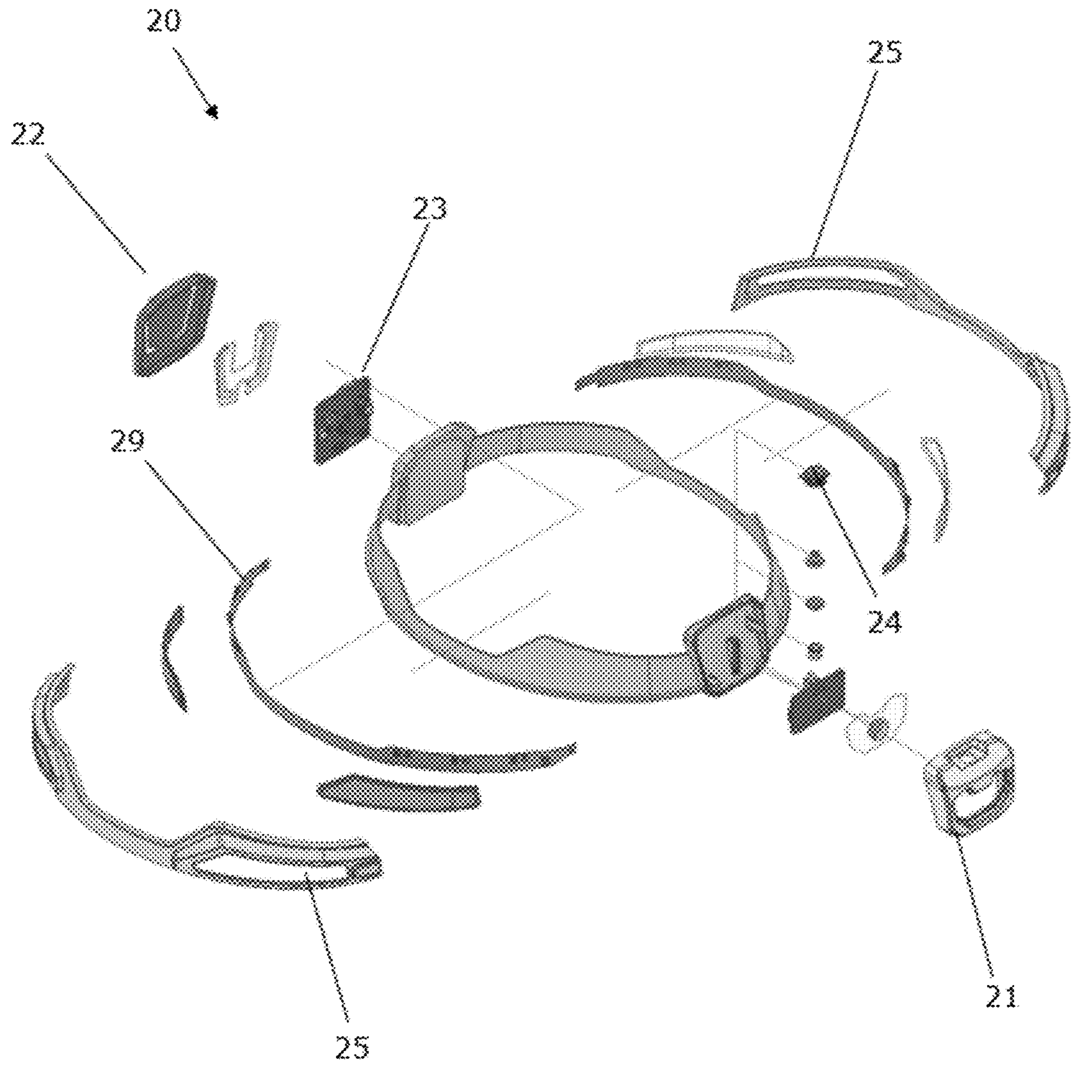
FIG. 6 illustrates an exploded view of the helmet belt of the present invention.

According to FIG. 6, an exploded view of the belt (20) can be seen, where both the front and rear lighting modules (21, 22) and the side lighting modules (25), formed by the layers that make up the helmet (1), consist of hollow ledges with a border around their entire perimeter and a transparent material in the center, such as transparent acrylic that covers and at the same time keeps isolated from the environment a panel of lights, such as LED lights distributed along the lighting modules (21, 22, 25). This material, in preferred configurations can be opaque, diffused or of any degree of translucency, according to the needs of the user.

In addition, it can be seen that the lights of the side lighting modules (25) are provided by two strips (29), which are located on the sides of the belt (20). On the other hand, the front and rear lighting modules (21, 22) have independent lights, which are arranged inside each of them, where the rear lighting module (22) also includes the controller element (23).

Figure 7:
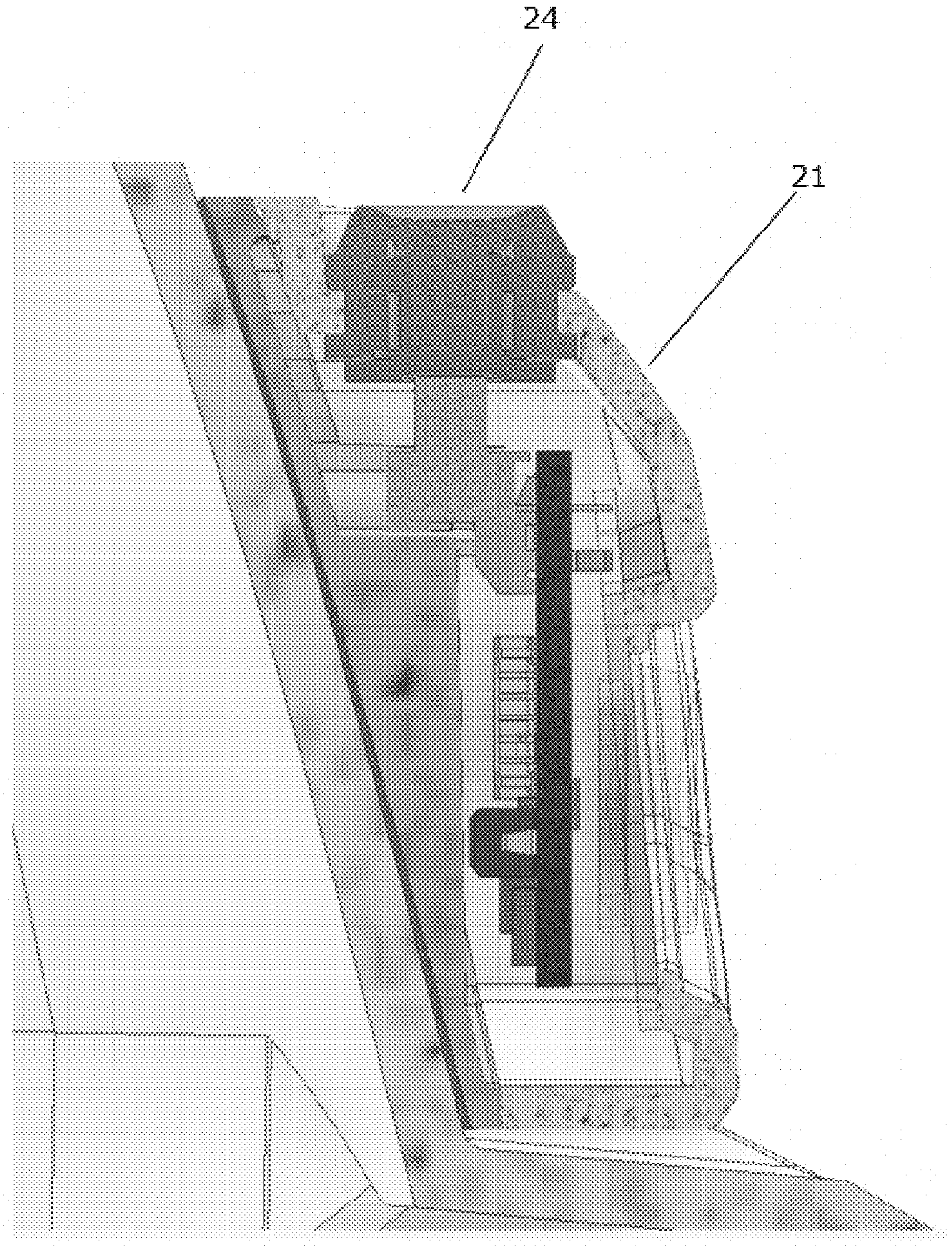
FIG. 7 illustrates in detail the front lighting module and its components.

FIGS. 6 and 7 show in detail the front and rear lighting modules (21, 22), as well as the location of their components. The front lighting module (21) consists of an oval wall ledge configured to house a high intensity spotlight, which is activated by the button (24) on the top of the module, which is also responsible for activating the different operating modes of the helmet (1). The light beam emitted by the spotlight is projected through a recessed opening located in the central part of the front lighting module, which has a transparent surface and an element to allow the focus and direction of the beam of light, which can be a magnifying glass, a prism or any other element that allows a light beam to be directed. According to the embodiment illustrated, this recess has an octagonal shape, where the frontal lighting module (21) is integrated to the belt (20), as shown in the previous figures. According to an alternative embodiment of the invention, the front lighting module (21) is connected to the belt (20) in a removable manner. For this purpose, the belt (20) includes in its front part a means of attachment, in which the front lighting module (21) is arranged under pressure.

The edges of the front lighting module (21) are shaped to match the profile of the central ledge of the cap (10) and the visor (12). In addition, the upper part of the rear face of the front lighting module (21) has a rear attachment which allows the front lighting module (21) to be attached to the front attachment of the helmet. To do this, the rear attachment consists of a pair of parallel L-shaped rear rails in opposite configuration to a pair of front rails on the front ledge and a rectangular section rear connector ledge located between and perpendicular to the rear rails.

The configuration described above allows the connection of the front lighting module (21) to the front ledge of the helmet (1), by attaching and sliding the rear rails of the front module to the front rails of the front ledge, ensuring this connection by means of the hook between the front connector ledge and the rear connector ledge. This ensures that both elements are firmly fixed to each other, while providing a watertight joint between the edges of the front lighting module (21) with the front face of the cap (10) and with the top face of the visor (12), to protect the elements located inside the front lighting module (21).

By means of the reverse operation it is also possible to disconnect the front lighting module (21) from the front ledge for maintenance and replacement of the lighting elements.

Figure 8:
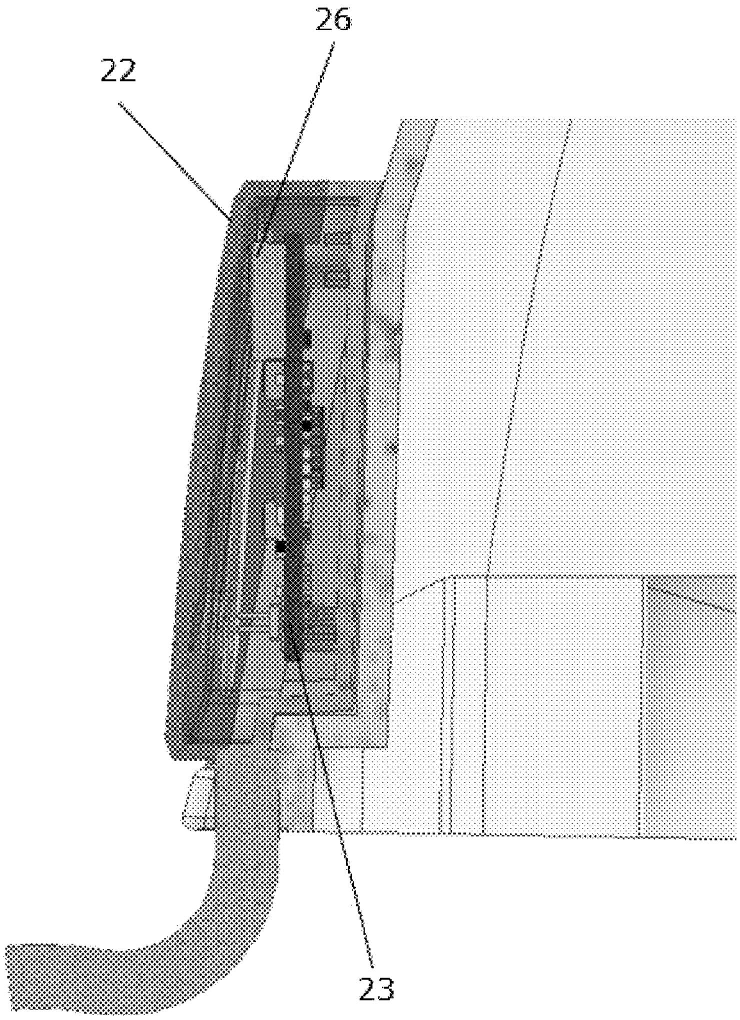
FIG. 8 illustrates in detail the rear lighting module and its components.

In relation to the rear lighting module (22), in FIG. 8 it can be seen that it has a similar construction to the front lighting module (21), with the difference that it has two lighting strips inside, preferably arranged with red lights, located in such a way that the light beams pass through the openings arranged in the rear module without any problem. In addition, the rear lighting module (22) houses the controller element (23), which has a plurality of components and allow the execution of the actions corresponding to each of the operating modes of the helmet (1).

In addition, the exterior housing of the rear lighting module (22) has two slots through which the light from the spotlight passes, which, in its preferred configuration corresponds to a red light, to indicate that the user of the helmet (1) is on his back.

Figure 9:
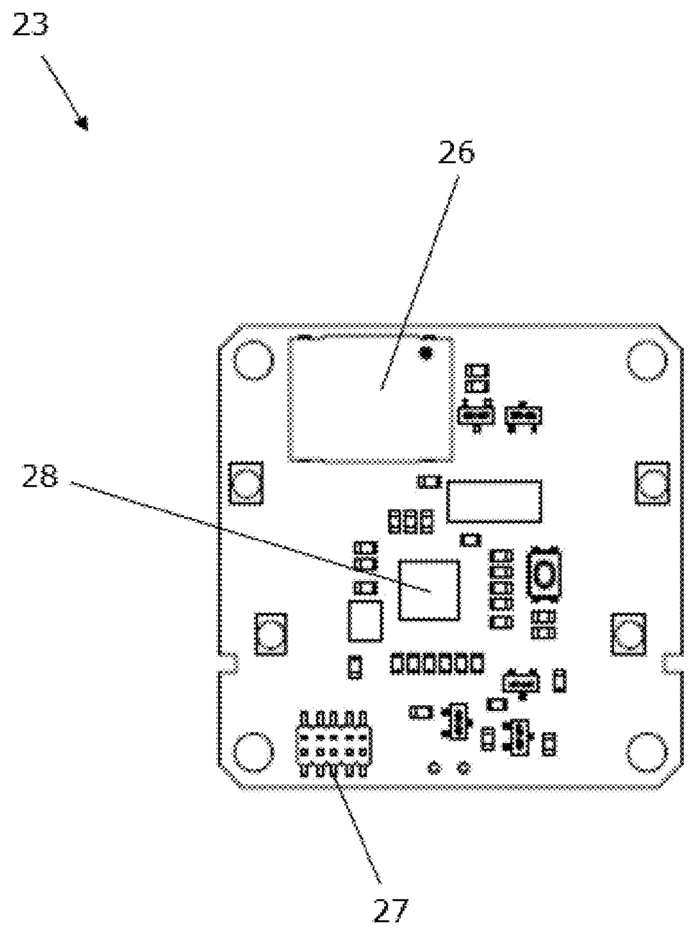
FIG. 9 illustrates in detail the controller element and its components.

On the other hand, FIG. 9 shows in detail the controller element (23), which has the ability to operate a plurality of helmet (1) components, such as the audible alarm (26), the input port (27) and the microcontroller (28). In relation to the input port (27), it has the function of being able to connect to the helmet (1) any kind of external device or apparatus, which can perform some additional function to those it normally performs, and also serves to connect a data processing device, such as a computer, to rescue and analyze all the information stored by the data storage element, for further analysis.

The controller element (23) can also contain various sensors, which allow measurements to be made of parameters of importance in the tasks performed by the helmet (1) user, information that can be stored by the data storage element.

Figure 10:
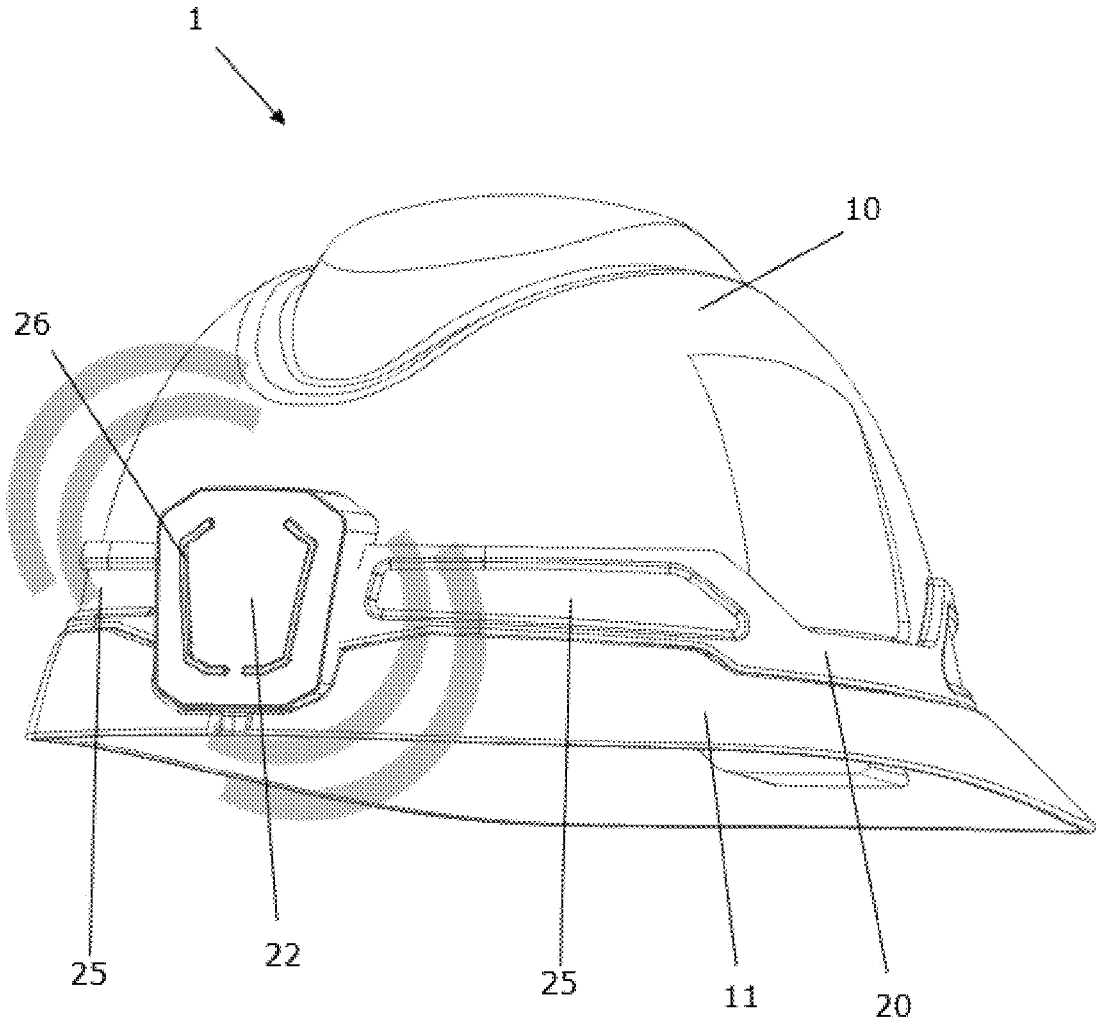
FIG. 10 illustrates the operation of the audible alarm of the helmet of the present invention.

FIG. 10 shows in detail the back of the helmet (1), where the waves drawn simulate the sound waves emitted by the audible alarm (26), which is arranged inside the rear lighting module (22).

In relation to the degree of protection that the different components of the helmet have, such as the front, rear and side lighting modules (21, 22, 25), the accelerometer, the controller element (23), the button (24), the data storage element, the energy storage element, the audible alarm (26), the tracking element, the input port (27), as well as the different sensors for measuring physical variables, each one of them corresponds to elements of tight and watertight nature, offering this way a high degree of safety to the user of the helmet, since the possibilities of entry of dust, water or any component from the environment to some of the mentioned elements are reduced to the minimum, preventing this way any risk of fault in the helmet or of electrocution in the user.

These characteristics in terms of tightness and waterproofing are achieved preferably through a system of seals, easily placed and minimally invasive for the elements to be protected.

Figure 11:
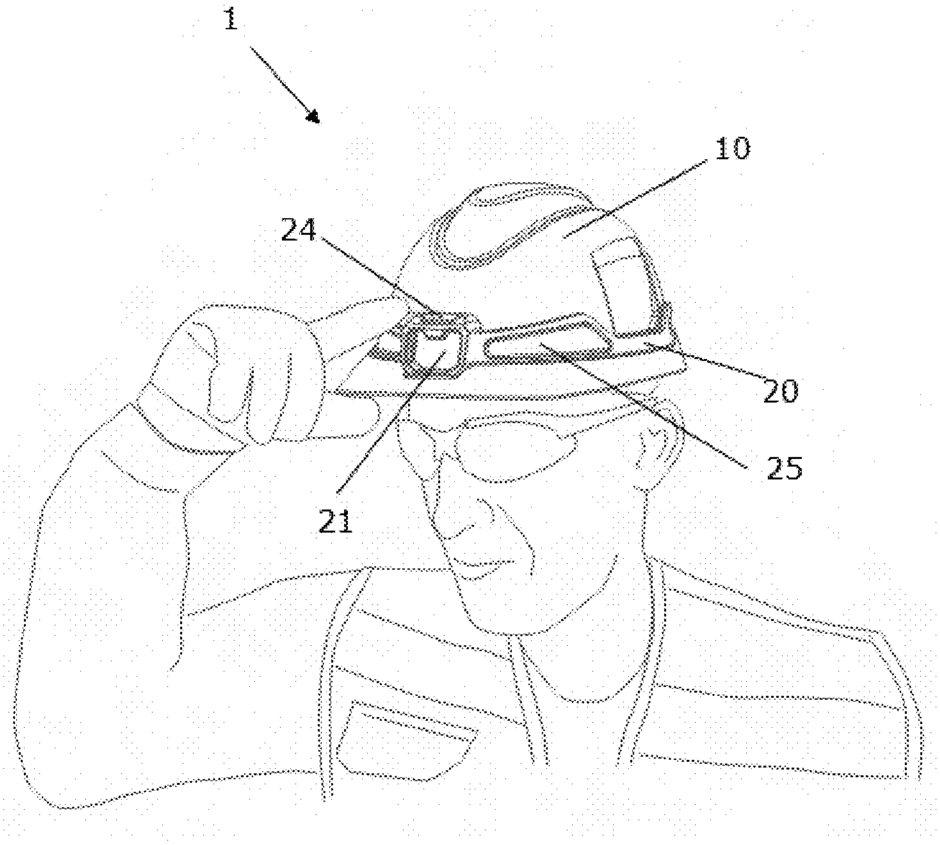
FIG. 11 illustrates a user making use of the helmet of the present invention.

Additionally, FIG. 11 shows the user using the helmet (1) and bringing his hand towards the button (24) to configure the helmet (1) in one of its modes of operation.

Figure 12:
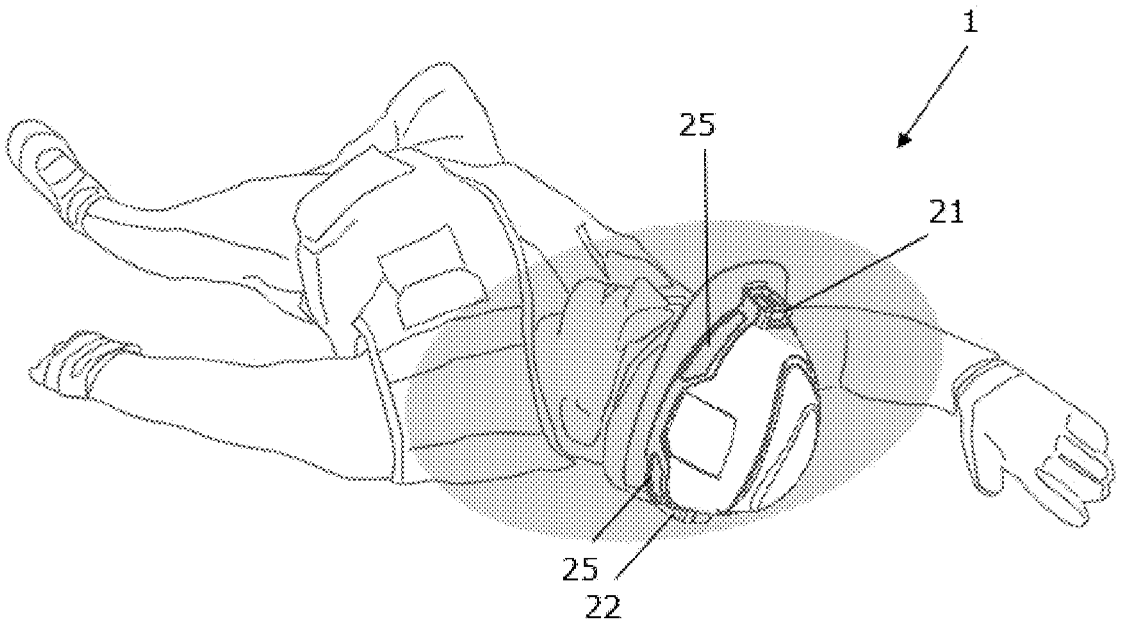
FIG. 12 illustrates a user in an emergency situation and the behavior of the helmet of the present invention in such situation.

Finally, FIG. 12 shows a user who has suffered an accident, a situation that the helmet (1) is able to detect thanks to an accelerometer (not shown in the figures, but located in the controller element (23)). When the accelerometer detects a crash or hit by the helmet (1) against a surface, it actuates an emergency mode, which activates the audible alarm (26), as well as all the helmet lights arranged in the lighting modules (21, 22, 25), in the color configured by the employer for emergency situations. In addition, it is possible to locate the user's location by means of a tracking element (not shown in the figures), such as a GPS or any other element that makes it possible to determine the position of an object or person, also arranged in the controller element (23).

NUMERICAL REFERENCES

1 Safety helmet
10 Cap
11 Wing
12 Visor
13 Harness
14 Adjustment mechanism
15 Neck cover
16 Safety Earmuffs
20 Belt
21 Front Lighting Module
22 Rear light module
23 Controller element

24 Button
25 Lateral Lighting Module
26 Audible alarm
27 Input port
28 Microcontroller

The invention claimed is:

1. A helmet to be used by a person in low light conditions, which allows detecting and alerting automatically in real time accidents and situations of alert and/or emergency, wherein the helmet comprises:

a cap, to cover the person's head;

a wing, which surrounds an entire perimeter of a bottom of the cap; and a visor, which corresponds to a projection of the wing on a front of the cap;

wherein the cap also comprises a belt which in turn comprises:

at least one front lighting module;

at least two side lighting modules, arranged on each side of the front lighting module;

at least one accelerometer;

a controller element, configured to control an operation of the front and side lighting modules and the accelerometer; and at least one button configured to facilitate control, by the person, of the operation of the front and side lighting modules;

wherein the belt surrounds the entire perimeter of the bottom of the cap, over the wing and the visor;

wherein the belt further comprises at least one rear lighting module, which comprises at least two additional side lighting modules arranged on each side of the rear lighting module;

wherein the controller element is further configured to control an operation of the rear lighting module and the additional side lighting modules;

wherein the at least one button is further configured to facilitate controlling, by the person, of the operation of the rear lighting module and the additional side lighting modules; and wherein the belt further comprises an audible alarm, which is activated when the accelerometer detects an impact or hit by the helmet against a surface.

2. The helmet according to claim 1, wherein the cap and the belt are arranged as one single piece of two layers of material.

3. The helmet according to claim 1, wherein the front, rear and side lighting modules illuminate through LED, incandescent, fluorescent bulbs, a combination of them or through any type of bulb providing illumination;

wherein the the front, rear and side lighting modules are of the same color or of different colors; and wherein the front and rear lighting modules, in conjunction with the side lighting modules, provide a 360° illumination range.

4. The helmet according to claim 1, wherein the front, rear and side lighting modules, the accelerometer, the controller element and the at least one button are airtight, waterproof and modular components, capable of being arranged in or removed from the helmet independently.

5. The helmet according claim 1, wherein the helmet also comprises a data storage element configured to store data concerning an operation of the helmet or obtained through the controller element and/or the accelerometer;

wherein the data storage element is an airtight, waterproof and modular component, capable of being arranged in or removed from the helmet independently.

6. The helmet according to claim 5, wherein it further comprises an energy storage element configured to energize the front, rear and side lighting modules, the controller element, the accelerometer and the data storage element;

wherein the energy storage element is an airtight, waterproof and modular component, capable of being arranged in or removed from the helmet independently.

7. The helmet according to claim 6, wherein the audible alarm is arranged in the rear lighting module;

wherein the audible alarm is configured to be operated independently or in combination with one or more of the front, rear or side lighting modules;

wherein the controller element and the at least one button are configured to control and operate, by the person, the function of the audible alarm respectively;

wherein the energy storage element and the data storage element are configured to energize the audible alarm and store information concerning its operation respectively; and wherein the audible alarm is an airtight, waterproof and modular component, capable of being arranged in or removed from the helmet independently.

8. The helmet according to claim 6, wherein it also comprises a location-tracking element configured to establish the exact location of the helmet's user;

wherein the controller element is configured to control an operation of the location-tracking element;

wherein the energy storage element and the data storage element are configured to energize the location-tracking element and store information concerning its operation respectively; and wherein the location tracking element is an airtight, waterproof and modular component, capable of being arranged in or removed from the helmet independently.

9. The helmet according to claim 6, wherein the helmet additionally comprises at least one sensor capable of measuring a physical variable in relation to the helmet or to its environment;

wherein the controller element controls an operation of the at least one sensor;

wherein the energy storage element and the data storage element are configured to energize the at least one sensor and store information concerning operation thereof respectively; and wherein the at least one sensor is airtight, waterproof and modular, capable of being arranged in or removed from the helmet independently.

10. The helmet according to claim 6, wherein the helmet additionally comprises an input port configured to facilitate a connection of additional external devices or sensors to the helmet;

wherein the controller element is configured to control an operation of the input port;

wherein the energy storage element and the data storage element are configured to energize the input port and store information concerning its operation respectively;

wherein the input port is an airtight, waterproof and modular component, capable of being arranged in or removed from the helmet independently;

wherein the input port is a port capable of receiving any device or sensor using Plug and Play (PnP) means for its connection or other type of connection means allowing interaction between two devices;

wherein the input port is arranged in the rear lighting module; and wherein the data storage element stores data obtained through devices and/or sensors connected to it by means of the input port.

11. The helmet according to claim 1, wherein the cap has a harness on an inner part which allows it to be molded and adjusted to a shape of the user's head by means of an adjustment mechanism;

wherein the harness comprises a sweatband and a neck cover;

wherein the cap also includes a chinstrap, placed on sides of the cap, on a lower part of wing; and wherein the cap also comprises two hooks, placed on the sides of the cap, on the belt, to insert safety earmuffs.

12. A procedure to control a helmet by a person, according to claim 1, which allows detecting and alerting automatically in real time accidents and situations of alert and/or emergency, wherein the procedure comprises the following modes of operation by manipulating the at least one button on the helmet:

a) from a state of non-operation or turning off of the helmet, by holding down the at least one button for a period of time, turning on lights at their maximum intensity in the front, rear and side lighting modules of the helmet;

b) from the mode described in a), by holding down the at least one button for a period of time, or in case an energy level in an energy storage element is reduced, keeping the lights on at their maximum intensity in the front and rear lighting modules and decreasing the intensity of the lights in the side lighting modules;

c) from the mode described in b), by holding down the at least one button for a period of time, returning to the mode described in a);

d) from the mode described in a) or b), by pressing the at least one button a number of times, switch off the lights on the side lighting modules, keeping the lights on at their maximum intensity on the rear lighting module and keeping the lights on at their maximum intensity on the front lighting module for a period of time, and then switch them off for the same period of time, repeating this cycle for a set time, and then returning to mode a) or b);

e) from the mode described in a), b) or d), by pressing the at least one button a number of times or in case the accelerometer detects an impact, keeping the lights on at their maximum intensity on the front lighting module in one color, keeping the lights on at their maximum intensity on the rear lighting modules and the side lighting modules in a different color from those of the front lighting module, and turn on the audible alarm periodically;

f) from the mode described in e), by pressing the at least one button a number of times, return to the mode described in a);

g) from mode a), b) or e), in case the energy level in the energy storage element is reduced and lower than in the mode described in b), keeping the lights on at their maximum intensity in the front and rear modules, turning them off and on again immediately and periodically, in conjunction with the audible alarm, and keeping the lights on the side lighting modules off;

h) from mode a), b), d), e) or g), by keeping the at least one button pressed for a period of time, turning off the lights of the front, rear and side lighting modules and the audible alarm if it is on.

13. The procedure to control a helmet according to claim 12, wherein in mode a), the period of time is in a range from 0 to 10 seconds, preferably in a range from 2 to 4 seconds.

14. The procedure to control a helmet according to— claim 12, wherein in mode b), the period of time is in a range from 0 to 10 seconds, preferably in a range from 1 to 3 seconds;

wherein in mode b), a level of energy remaining in the energy storage element allows an operation, according to embodiment a), in a range between 30 minutes and 5 hours, preferably in a range between 1 and 3 hours; and wherein in mode b), an intensity of the lights in the side lighting modules decreases by a percentage in a range between 20% and 80%, preferably between 40% and 60%.

15. The procedure to control a helmet according to claim 12, wherein in mode c), the period of time is in a range between 0 and 10 seconds, preferably in a range between 1 and 3 seconds.

16. The procedure to control a helmet according to claim 12, wherein in mode d), the period of time is in a range between 0 to 10 seconds, preferably in a range between 1 and 3 seconds;

wherein the set time in which mode d) is performed is in a range between 0 and 60 seconds, preferably in a range between 5 and 15 seconds.

17. The procedure to control a helmet according to— claim 12, wherein in mode e), the number of times the at least one button is pressed is in a range between 1 and 10 times, preferably in a range between 2 and 4 times;

wherein in mode e), a period of time in which the audible alarm is turned on is in a range between 0 and 30 seconds, preferably in a range between 4 and 10 seconds.

18. The procedure to control a helmet according to— claim 12, wherein in mode f), the number of times the at least one button is pressed is in a range between 1 and 10 times, preferably in a range between 2 and 4 times.

19. The procedure to control a helmet according to claim 12, wherein in mode g), a level of energy remaining in the energy storage element allows an operation, according to embodiment a), between 1 minute and 2 hours, preferably in a range between 10 and 30 minutes;

wherein in mode g), a period of time in which the lights of the front and rear lighting modules are switched off and on again, in conjunction with the audible alarm is in a range between 0 and 30 seconds, preferably in a range between 5 and 15 seconds.

20. The procedure to control a helmet according to— claim 12, wherein in mode h), the period of time is in a range between 0 and 20 seconds, preferably in a range between 3 and 10 seconds.

21. The helmet according to claim 1, wherein the belt is arranged as one removable-by-pressure piece from the cap.

* * * * *